(No Model.)

M. VON DOLIVO-DOBROWOLSKY.
APPARATUS FOR DETERMINING DIFFERENCES BETWEEN PHASES OF TWO ELECTRIC ALTERNATING CURRENTS.

No. 540,153. Patented May 28, 1895.

Witnesses:
E. Wallace Dick
Robt W Cox

Inventor:-
M. von Dolivo Dobrowolsky
by Marcellus Bailey
his atty.

THE NORRIS PETERS CO., PHOTO-LITHO., WASHINGTON, D. C.

United States Patent Office.

MICHAEL VON DOLIVO-DOBROWOLSKY, OF BERLIN, GERMANY, ASSIGNOR TO THE ALLGEMEINE ELEKTRICITÄTS-GESELLSCHAFT, OF SAME PLACE.

APPARATUS FOR DETERMINING DIFFERENCES BETWEEN PHASES OF TWO ELECTRIC ALTERNATING CURRENTS.

SPECIFICATION forming part of Letters Patent No. 540,153, dated May 28, 1895.

Application filed October 27, 1893. Serial No. 489,273. (No model.) Patented in Germany April 14, 1892, No. 68,215; in Switzerland December 12, 1892, No. 6,074, and in England December 15, 1892, No. 23,113.

*To all whom it may concern:*

Be it known that I, MICHAEL VON DOLIVO-DOBROWOLSKY, a subject of the Emperor of Russia, residing in Berlin, Kingdom of Prussia, German Empire, have invented a new and useful Apparatus for Determining Differences Between the Phases of two Electric Alternating Currents of Like Number of Alternations, (for which I have obtained patents in Great Britain, No. 23,113, bearing date December 15, 1892; in Switzerland, No. 6,074, bearing date December 12, 1892, and in Germany, No. 68,215, bearing date April 14, 1892,) of which the following is a specification.

The object of the present invention is to provide an apparatus for indicating and measuring any difference that may occur between the phases of two electric alternating currents having a like number of alternations.

The said apparatus, which is hereinafter called "phase-meter," consists in the combination, with two stationary coils or sets of coils arranged at an angle to each other, and means for feeding one coil or set of coils with one of the currents to be compared with each other, and the other coil or set of coils with the other current, of a metallic body rotatably arranged within the magnetic fields of said coils or sets of coils, a device for counteracting the rotation of the said metallic body, and means for indicating deflections of the same.

Figure 1:
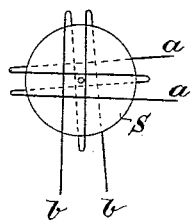

On the annexed two sheets of drawings, Figure 1 is a diagram serving to explain the principle the invention is based on. Figs. 2 to 7, inclusively, are somewhat diagrammatical plans of six different modes how to construct the phase meter which will be fully described hereinafter, and which I contemplate to be the best modes known to me for that purpose.

In order that the present invention may be fully understood, I will first explain the principle on which the same is based, reference being made to Fig. 1.

Suppose a metallic body S be rotatably arranged in the magnetic fields of two conductors or coils, $a$ and $b$, placed at an angle to each other. Suppose further each of these coils be fed with an alternating current, and the two currents have a like number of alternations. As is well known, a rotary movement will be imparted to the body S, provided that the phases of the two currents are shifted to each other. This principle of producing rotary movement has already been made use of to construct electric motors. Now, if simultaneously a counter-force (such as the action of a weight to be lifted, or of a spring to be wound up, or the attraction of a magnet) is caused to interfere so as to check the rotation of the said metallic body, the amount of counter-force absorbed in arresting the rotation, and the direction of said force furnish a means for determining the turning momentum or torque produced by the two currents. With a given number of alternations, the torque imparted to the metallic body S is dependent on the angle at which the two magnetic fields or coils, $a$ and $b$, are set to each other, on the strength of the two currents, and on the amount or angle by which their phases are shifted relatively to each other. Under otherwise similar conditions the said turning momentum reaches a maximum when the latter angle is equal to the angle at which the two magnetic fields are placed to each other.

Having thus explained the principle of the phase-meter, I proceed to describe several ways how the same can be carried out.

Figure 2:
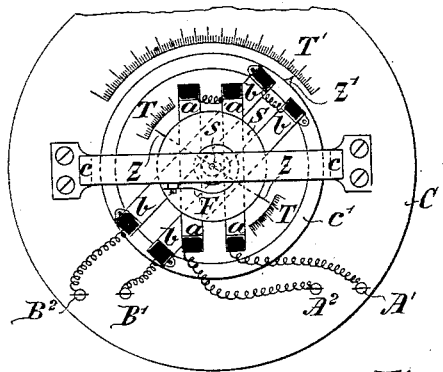

Referring to Fig. 2 the movable metallic body S consists in a disk fixed on a spindle $s$, which is mounted in suitable bearings disposed in a base plate C and in a cross-bar $c$ fixed on the latter. To the spindle is attached one end of a spiral spring F of which the other end is fastened to cross-bar $c$. The disk S is surrounded by two pairs of coils $a, a$ and $b, b$ set at an angle to each other. One pair of coils, for instance the pair lettered $b, b$ is made movable, so that it can be shifted round the disk S for the purpose of rendering the apparatus independent on the strength of the currents. To this end the pair of coils $b, b$ is fixed on a ring C' of non-conducting material arranged concentrically to the spindle $s$ and guided by a circular groove cut into the base plate. On the latter are arranged two binding screws A' A² with which are connected the free ends of the pair of coils $a, a$, and two binding screws $B'$ $B^2$ to which are connected the free ends of the other pair of coils $b, b$. On the spindle $s$ are fixed two pointers Z Z placed at an angle of one hundred and eighty degrees to each other, and the base-plate is provided with scales T T in face of said pointers. Moreover, the movable pair of coils $b, b$ has fixed to it a pointer $Z'$, the scale $T'$ for which is arranged outside of the ring $C'$.

Suppose the two pairs of coils be set at a right angle to each other. If one of the two alternating currents to be compared with each other is caused to flow through the pair of coils $a, a$ by the way of the binding screws $A'$ $A^2$, and if simultaneously the other current is permitted to circulate through the pair of coils $b, b$ by the way of the binding screws $B'$ and $B^2$, the disk S will be given a tendency to rotate, provided the phase of one current be shifted to that of the other current. This rotation will take place to the right or to the left accordingly as the phase of one of the two currents is in advance or is lagging relatively to the phase of the other current. The rotation of the disk has the effect to wind up the spring F. Consequently the rotation will be arrested as soon as the tension of the spring neutralizes the torque created in the disk S by the co-operation of the two currents. The deflection of the disk, as seen by the pointers Z, is read off the scales T and gives a measure for the turning momentum or torque imparted to the disk S; and in order that the indication may be made independent on the strength of the currents the pair of coils $b, b$ is shifted until the amplitude of the pointers Z reaches its maximum. The angle formed at this moment between the coils $a, a$ and $b, b$ is equal to the angle by which the phases of the two currents are shifted to each other. The latter angle is indicated by the pointer $Z'$ on the scale $T'$. It is evident that one of the pointers T and its scale can be omitted.

Figure 3:
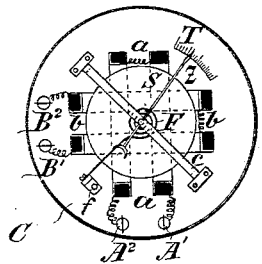

In many cases the shifting of the pair of coils $b\, b$ will not be necessary either because the two currents are always alike in strength or because it is only required to determine whether a shifting of the phases has taken place and in what direction. For use in such cases the phase meter may be simplified by fixing both pairs of coils on the base plate, so that the ring $C'$, pointer $T''$, and scale $Z'$ are dispensed with. Such a simplied form of phase meter is represented in Fig. 3. In this figure the counteracting spring F is shown as attached at one end to an upright arm $f$ fixed to the base plate C.

The coils $a, a$ and $b, b$ may be provided with iron cores to strengthen their effect. The arrangement of such strengthening cores may be carried out in several ways some of which will presently be described in combination with modifications of other parts.

Figure 4:
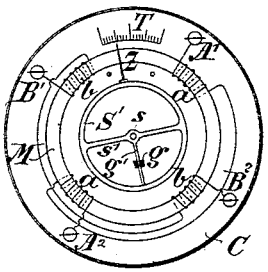

In Fig. 4 the rotary part of the phase-meter consists in a ring $S'$ of iron or other metal, which is mounted on the spindle $s$ by means of a cross-bar $s'$. This ring is encompassed by another ring of iron M, which is stationary. On this ring the pairs of coils $a, a$ and $b, b$ are wound diametrically opposite to each other (similar as in a Tesla motor), the ring M forming a core common to the four coils. Moreover, in this instance a weight $g$ is made use of for checking the rotation of the ring $S'$, the said weight being adjustably mounted on an arm $g'$ extending from the hub of cross bar $s'$ to the ring $S'$.

Figure 5:
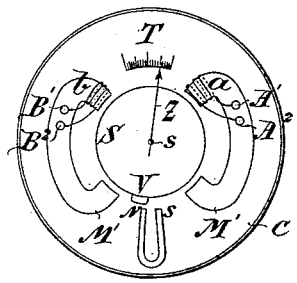

In Fig. 5 the movable body of the phase meter again consists in a disk S as in Figs. 2 and 3, but instead of two pairs of coils $a, a$ and $b, b$ there are but two single coils $a$ and $b$ employed in combination with one individual iron core, $M'$, for each coil. The two cores are placed at opposite sides of the disk S. Their ends are bent radially toward the disk and their end surfaces are curved so as to be concentric with the periphery of the same. On the upper end of the right hand core is wound the coil $a$, while the coil $b$ is wound on the upper end of the left hand core. In this meter the counteracting force is exerted in the form of magnetic attraction. For this purpose the disk S has attached to it a piece of iron V, and a permanent magnet N S is disposed in proximity of this iron piece, so that the latter is always under magnetic attraction.

Figure 6:
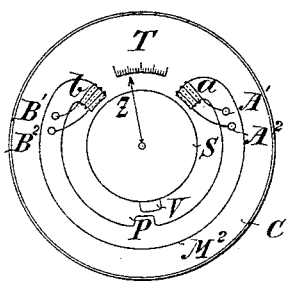

In Fig. 6 two single coils $a$ and $b$ are combined with a common core $M^2$ which is curved so as to encompass the greater part of the periphery of disk S and of which the ends are bent radially toward the disk, the coils being wound on these ends. Thus the core $M^2$ and the coils $a$ and $b$ form an electromagnet. In the middle portion of the core $M^2$ a pole P is formed on the side adjacent to the disk S and in face of this pole the disk is provided with an iron piece V. When the coils $a$ and $b$ are fed with currents the pole P will attract the iron piece V at the same time the disk S is caused to rotate by the co-operation of the two coils. This arrangement possesses the advantage of making the deflections of the disk S nearly independent of the strength of either current, as the attractive power of the pole P decreases accordingly as the currents diminish in strength, and vice versa.

Figure 7:
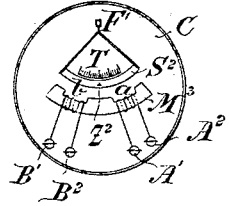

In Fig. 7 the metal body to be rotated consists in a segment $S^2$ of a ring and it is suspended to a spring $F'$ so as to form a kind of pendulum the deflections of which take place against the resistance of the said spring. In this instance also two single coils $a$ and $b$ are employed in combination with a common iron core $M^3$ which likewise consists in a segment of a ring. T is a scale fixed opposite to the inner side of the pendulum $S^2$, and $Z^2$ is a countermark provided for on the latter in a central position and in face of the scale.

I am aware that two coils or groups of coils set at an angle to each other and fed with alternating currents have already been combined with a movable metallic body placed within their magnetic fields for the purpose of producing rotary motion and I, therefore, do not broadly claim such an arrangement, but

What I claim as my invention is—

In apparatus for indicating and measuring differences between the phases of two electric alternating currents of like number of alternations the combination with a coil or a set of coils for each current, the two coils or sets of coils being set at an angle to each other, and a metallic body rotatably arranged in the magnetic fields of said coils or groups of coils, of a device for opposing a counterforce to the rotation of said metallic body, and means for indicating the amplitude of the latter, substantially as hereinbefore described.

In testimony whereof I have hereunto set my hand in the presence of two subscribing witnesses.

MICHAEL VON DOLIVO-DOBROWOLSKY.

Witnesses:
SIMON ROOS,
ANTON WEBER.